March 31, 1942. R. W. FRANKS 2,277,751
DRAFT CONTROL
Filed June 12, 1939. 2 Sheets-Sheet 2
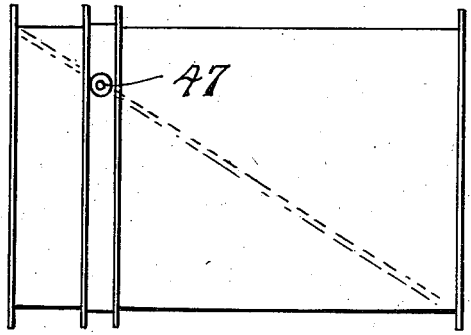
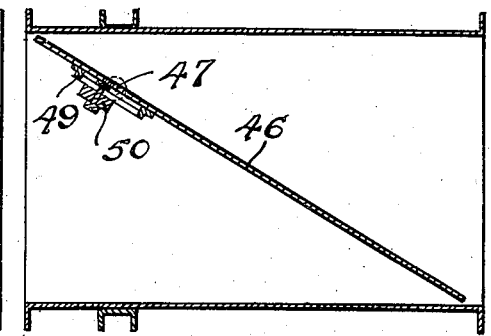
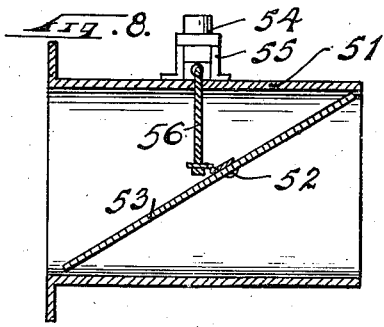
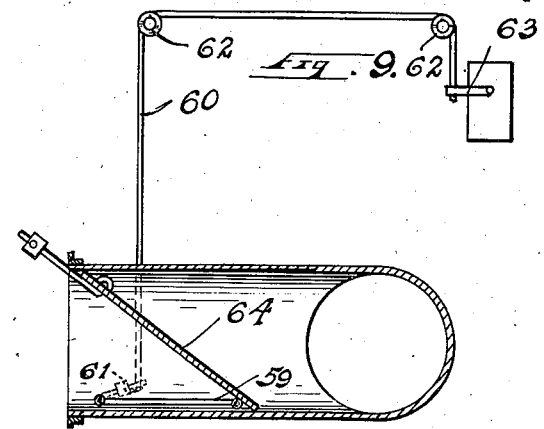
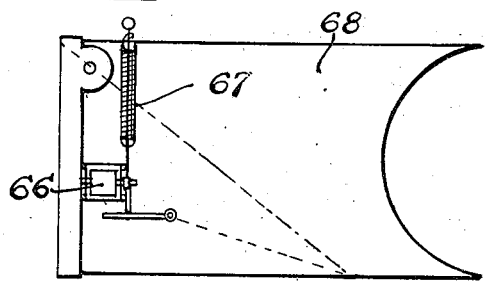
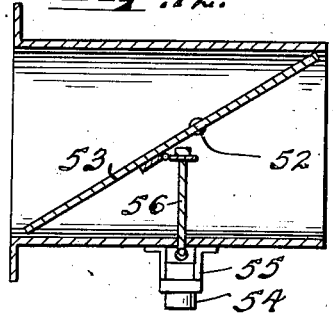
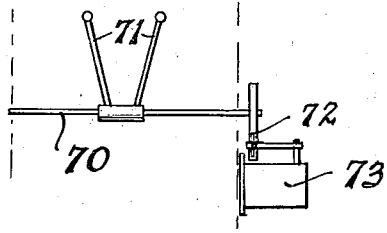
Inventor
Roye W. Franks
By R. M. Thomas
Attorney Patented Mar. 31, 1942

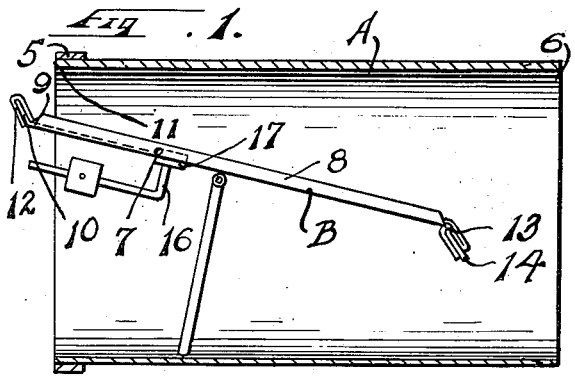

2,277,751

UNITED STATES PATENT OFFICE 2,277,751

DRAFT CONTROL

Roye W. Franks, Little Rock, Ark.

Application June 12, 1939, Serial No. 278,676

6 Claims. (Cl. 236—45)

My invention relates to draft control devices, and has for its object to provide a new and efficient draft control device which will control the draft in the flue, prevent any draft through the furnace when it is not burning and which at the same time will prevent any excessive draft through the fire box when the fire is burning.

A further object is to provide a control system for controlling the draft through furnaces and industrial furnaces through the control of the fuel supply in coordination and cooperation with the control device to decrease the draft through the furnace proportionately, as the fuel is decreased.

A still further object is to provide a control device for furnaces in which the device is controlled by the fuel supply or the steam generating in the boiler and also to provide a device acting independently to limit draft through the fire box of the furnace and prevent excessive draft therethrough.

A still further object is to provide a draft control device which will save fuel in the quantity used and which will produce greater heat and efficiency from the fuel used in the furnace.

A still further object is to provide a draft control device for furnaces which are hand fired and which control is manually controlled in the conventional manner for checking the draft through the furnace when it is desired and to automatically control the draft through the furnace when the manual control is not being employed.

These objects I accomplish with the device illustrated in the accompanying drawings in which similar numerals and letters of reference indicate like parts throughout the several views and as described in the specification forming a part of this application and pointed out in the appended claims.

In the drawings,

Figure 1 is a longitudinal section through my control showing the plate valve held open.

Figure 2 is a longitudinal vertical section as in Figure 1 but with the plate valve closed.

Figure 3 is a section of a draft control modified to utilize and show the control of the draft by either air pressure, steam pressure or otherwise where a diaphragm is used to actuate the valve plate.

Figure 4 is a side elevation of one of the controls showing a different means of hooking up the control from the diaphragm directly to compound levers for controlling the plate valve.

Figure 5 is a plan view of the plate valve control arm.

Figure 6 is a side elevation of a type of device used to be secured to larger flue pipes and not to be merged therewith.

Figure 7 is a diametrical longitudinal section of Figure 6 with no control shown for the plate valve merely utilizing the draft conditions for such control.

Figure 8 is a sectional view of a modified type of device in which the plate valve is controlled by an electromagnet or solenoid.

Figure 9 is a diagrammatic sectional view of the plate valve and casing controlled by a wall motor or cable.

Figure 10 shows the use of a wall motor and reaction springs attached directly to the casing of the device.

Figure 11 is a plan view of a modified plate valve control mechanism.

Figure 12 is a sectional view of the device shown in Figure 8 with the solenoid mounted below the plate valve.

This application is a continuation in part of application, Serial No. 39,941 which issued as Patent No. 2,161,809, dated June 13, 1939.

In the drawings I have shown different modes of building and operating my invention to best meet the demands of the trade and Figures 1 and and 2 show a simple inexpensive device which may be used for either hand firing or automatic firing and which consists of a rectangular casing A, having one end 5 reinforced to give it rigidity and the other end 6 formed to fit the flue pipe of the furnace. In some instances, the flue pipe is a square or flat sided pipe and in that event the end 6 is made as shown in full lines in the drawings but in other cases the flue pipe as in home furnaces, is round or rather cylindrical and in that event the end of the casing A is cut away in a curve. This plate valve B is pivoted nearer the top end by a pivot bar 7 passes out through each slide wall of the casing in suitable bearings. The plate valve B is made of a flat sheet metal having each edge turned up in a flange 8 and with the top end 9 bent upwardly to form a flange 10 at an angle to the plate valve B and this flange 10 is covered by a felt 12 or other suitable sealing material to seat against the top 11 of the end 5 of the casing to seal it off completely when the plate valve is closed. The opposite end of the plate valve B is turned down by bending the material of the plate back upon itself and forming a U-shaped channel 13 in which a felt strip 14 is carried to seal the lower end of the plate valve to the casing when the valve is closed, thus making a practically air tight casing and draft damper when the valve is closed. This closed position is shown fully in Figure 2 of the drawings.

On the underside of the plate valve I provide an adjustable counter balance C which consists of a rod 16 rotatably mounted in a bearing 17 on the bottom face of the plate valve B near the top end thereof practically in alignment with the pivotal point of the valve and this rod 16 is bent at a right angle to place the main body 18 thereof substantially parallel to the plate valve B. On this rod there is an adjustable weight 19 which is held in fixed relation to the rod by a set screw 20. This weight is adapted to be shifted up or down the rod to maintain a predetermined balance relation between the upper and lower portions of the valve plate commensurate with the normal draft through the flue and is set when the device is installed to the flue pipe. It will be obvious that the flue may be vertical or horizontal and that the valve plate will necessarily need to be changed in its mounting in the casing for the vertical type over that shown in the drawings of the horizontal type. If the conditions require it the rod may be turned around from that direction shown in the drawings and the weight placed below the pivotal point of the plate. This depends entirely upon individual installations.

The control for the draft control plate B is provided by passing a control arm 22 through each side of the casing with one side having the arm extending in a lever 23. This lever is made to be connected to any suitable automatic control medium such as shown in Figures 3, 4, 9 or 10, or to be manually controlled as required depending upon how the furnace on which the device is used is being fired and somewhat upon the type of the furnace itself. The central portion of the arm 22 is bent into an inverted V-shape 24 and small flanges 25a are secured on the arm where it is passed through the side walls of the casing to prevent side movement. Medially of the V-shaped section 24 of the arm or at the apex of the V, I provide a roller 25 adapted to engage upon the under side of the plate valve B and actuate the valve when the arm is actuated. This roller eliminates friction and noise and makes for easier movement and control of the plate valve. The roller is held in place by spaced apart washers 26 secured to the apex of the arm by suitable means such as spot welding or friction fit, or the bending of the rod may hold the washers in place.

In hand fired furnaces this device acts as a check draft during that time when it is desired to retard the fire but as an automatic control during that period when the firing is taking place. When used as a check draft the control may be manual or automatic as desired. When used manually as a check draft a cable may be substituted for the bar 33 of Figure 3 or the cable 60 of Figure 9 may be raised by hand.

In Figure 3 the device is shown with a slightly modified control in which the control arm herein designated as 28 is adapted to control the plate valve 29 which has a weighted counterbalance arm 30 extended upwardly therefrom with the pivot 31 near the top of the casing 32. A link bar 33 connects the arm 28 with a diaphragm lever 34 which in turn is pivotally mounted to the diaphragm casing 35 by a pivot 36 and which link bar is actuated by the position of the diaphragm (not shown) as it is inside the biscuit type of casing 35. The lever 34 may be weighted and balanced by the weights 38. This particular casing is shown attached to a cylindrical pipe to show the modification of the end of the casing mentioned above.

Figure 4 shows a modification of the device in which the plate valve is controlled by a diaphragm E mounted to actuate a pivoted lever 40. This lever 40 is pivoted at one end and is provided at the other end by adjustment holes 42 to which holes a link bar 43 is connected. The other end of this bar is attached to a control lever 44 which lever may be the end of the pivot bar 7 of the plate valve B. It will be obvious that the link 43 might be connected at its lower end to the lever 23 of Figure 5 to control the opening of the plate valve B instead of the lever 44 as shown. Thus the position of the plate valve may be controlled by the pressure introduced into the diaphragm through the inlet pipe 45.

Figures 6 and 7 show a type of the device which is used for all installations where only a limit control is desired and shows a damper 46, pivoted at 47 and carrying a central casting 49 near the top end thereof on which an adjustably positioned weight 50 is carried. The main points of this control are a square casing which enables the user to get more effective control area than possible with a round control casing, the mounting of the control plate valve or damper 46 at an angle to get still further effective area and at the same time restrict the rotative angle through which the damper valve moves, thereby allowing better balance in passing from closed to wide open position and to make an adjustable damper plate which can be set to its proper position when installed. As will be obvious this adjustment will vary greatly depending upon the furnace, stack, and draft conditions. The operation of this particular device is substantially as follows: When the stack is cold there is practically no draft therein and the damper plate remains closed, but is free to open as the draft increases in the stack when fired. This opening is directly proportional to the amount of draft in the stack, and the vane is operated by the pressure differential between the furnace room and the stack.

Figures 8 and 12 show the control as 51 with the valve pivotally mounted therein at 52 the plate valve being 53. In Figure 8 this valve is controlled by a solenoid 54 mounted in a bracket 55 above the casing and with a depending arm or cable 56 attached to the valve 53 in a yielding, hinged or pivoted connection so that when the solenoid is actuated the valve will be opened. The actuating and operation of the solenoid may be by a thermostat in the room being heated by a furnace room temperature, by furnace temperature, or any other electrical control designed for the specific purpose of energizing electromagnets, solenoids, or wall motors, and the controls may be of any type so long as the current is introduced into the solenoid as required. The only difference between Figures 8 and 12 being that the solenoid is mounted below the casing and is utilized to raise the plate valve by exerting a thrust rather than a pull.

Figure 9 is a modified type of control which was shown in my former patent application mentioned heretofore and this construction is identical to the casing and valve shown in Figure 3 with this difference; the control 59 for the valve is flexibly connected thereby by a cable 60 attached to the control arm 61 and passed over suitable sheaves 62 to a wall motor control arm 63. When the control 59 is in the "down" or non-operating position this plate valve 64 operates as the other freely pivoted control plates operate but when the arm is moved upwardly, the angle through which the valve 64 can be rotated is limited, and as the vane is raised the draft to the furnace is limited, thereby affording a means of reducing the maximum draft in accordance with the firing demands. At all times the vane is free to respond in excess of the maximum allowed by the position of the arm since there is no rigid connection between the arm and plate valve. In other words, the plate valve is draft responsive at all times except, when in the maximum open position. The arm is operated in this case by the wall motor, which may in turn be operated by furnace temperature, furnace pressure, room temperature, or any electrical device such as timing devices for periodic firing, stoker controls etc.

In the device shown in my drawings where the plate valves are controlled by diaphragms they may be actuated by air pressure, stoker air pressure, oil pressure in oil burners, steam pressure, heat expansion diaphragms or any other way where pressure caused by any of these means will move a movable lever. Any of these methods may be used which can act upon an arm or upon the diaphragm to raise the valve when the fuel supply is stopped or when it is desired to decrease the draft and check the fire.

In Figure 10 I have shown the use of a wall motor 66 and return spring 67 on the plate valve with the wall motor attached to the casing 68 which enables me to use a cheaper motor and return it to its starting position by the spring pressure. In operation the motor 66 will operate the lever similar to 23 against the action of the spring 67. The motor 66 is a well known type of motor which is capable of operating against the tension of the spring 67 and holding said lever in desired position against the tension of the spring.

A modified type of plate valve control is shown in Figure 11 which consists of a shaft 70, extended legs 71 and a directly connected wall motor 73 attached to actuate the shaft 70 by a lever 72.

It will be obvious to one skilled in the art that this particular type of control will be just as effective mounted on an angle up to 45 degrees as when used on a horizontal or vertical flue. This is possible as the ends of the shaft on which the plate valve is mounted are sometimes utilized as point bearings and by punching the side wall of the casing they may be mounted any place therein. This type of mounting prevents any side movement of the plate valve.

Having thus described my invention, I desire to secure by Letters Patent and claim:

1. A draft control for furnaces comprising, a casing square in cross section with one end open and the other end to be in open communication with the flue pipe of the furnace; a draft responsive rectangular plate pivotally mounted diagonally in said casing when in closed position near the open end thereof; a depending balance rod rotatably mounted on the underside of said plate said rod to extend either above or below the pivotal axis of said plate as required to balance the plate; a weight adjustably positioned along said rod relative to the pivotal axis of said plate; and means on each end of said plate to form an air tight seal between the interior of the casing and the plate.

2. A device as set out in claim 1 including a control lever mounted in the bottom of said casing and adapted to engage the valve by which the valve may be raised independently of the draft through the casing; and means to operate said control lever to prevent excessive draft through the flue pipe of the furnace.

3. A draft control device for furnaces comprising, a rectangular casing square in cross section with one end in open communication with the flue pipe of the furnace and the other end open to the atmosphere; a draft responsive rectangular plate valve mounted to lie diagonally of said casing and the other end open to the atmosphere, said valve having the forward end turned up to engage the outside face of the open end of the casing across the top and with the inner end of the valve turned down and bent back upon itself to form a slot; a felt strip carried on each end of said valve to insure perfect sealing of the valve to the casing; means including an adjustable weight on a pivoted arm to balance said valve; a control lever for said valve, said lever being formed as an inverted V with its apex adapted to engage the valve and with the ends of the legs mounted in the side walls of the casing and with one leg extended and bent parallel to the wall of the casing to act as a control arm for said lever.

4. A device of the class described comprising, a rectangular casing square in cross section with one end open to the atmosphere and the other end attached in open connection with the interior of the flue pipe of a furnace but not in the path of travel of the consumed gases from the furnace; a rectangular plate valve freely mounted diagonally in said casing to give the greatest area of opening with the least amount of movement of the valve; a control lever mounted across the base of said casing with one portion adapted to engage the bottom of the valve to raise it to full open position; means from without the casing to control the movements of the lever commensurate with the draft through the flue pipe and to permit free opening of the valve due to excessive draft through the flue pipe when the lever is not being operated.

5. A device as set out in claim 4 including, means at each end of said rectangular plate valve to seal the juncture between the plate and casing when the valve is in the closed position.

6. A draft control device for furnaces comprising a casing which when cross sectioned has opposite sides parallel, with one end open to the atmosphere and the other end so adapted that it can be attached to the flue pipe of the furnace but not in the path of travel of consumed gases, a singe draft responsive rectangular plate valve pivotally mounted in said casing near the open end thereof, with the pivotal axis of the valve near one end thereof and off center in relation to a medial plane of the casing, an adjustable weight in conjunction with said plate valve to alter balance thereof, said plate valve when closed being diagonally supported longitudinally in said casing, with one end engaging the inner surface of one side of said casing and the other end resting on the opposite side of the casing, said valve being at such an angle that the effective area is substantially increased, and the rotative angle substantially decreased whereby the draft through the furnace is accurately and sensitively controlled.

ROYE W. FRANKS.